June 17, 1958     G. A. KENDALL     2,838,944
LINKAGE MECHANISM
Filed May 28, 1957     2 Sheets-Sheet 1
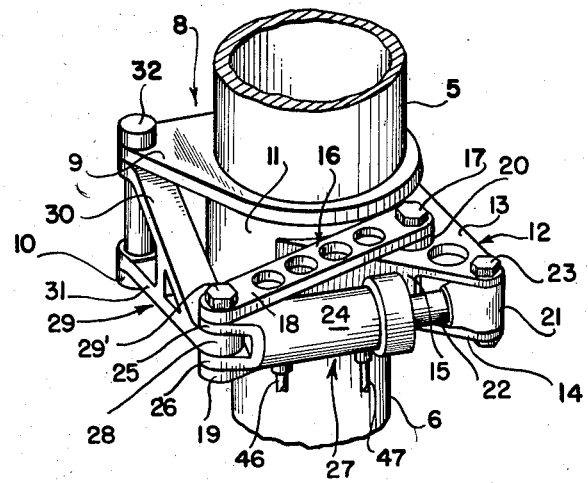
INVENTOR.
GILES A. KENDALL
BY
*R. E. Granque*
Attorney

INVENTOR.
GILES A. KENDALL

United States Patent Office 2,838,944
Patented June 17, 1958

2,838,944

LINKAGE MECHANISM

Giles A. Kendall, Van Nuys, Calif., assignor to Menasco Manufacturing Company, Burbank, Calif., a corporation of California Application May 28, 1957, Serial No. 662,066

5 Claims. (Cl. 74—99)

This invention relates to a linkage mechanism for converting change in the length of one member into rotational movement of another member and relates more particularly to a steering mechanism for aircraft landing gears which imparts a relatively constant steering torque to the wheels through a comparatively wide range of steering angles.

Typical aircraft landing gears incorporate a shock absorber which comprises a cylinder fixed to the aircraft and a piston movable within the cylinder. The wheels of the aircraft are attached to the piston so that the piston will move axially along the cylinder to absorb the landing shock. Also, a steering mechanism is provided to rotate the piston relative to the cylinder in order to steer the aircraft while on the ground.

In some present types of steering mechanisms, a triangular linkage is utilized which comprises a fixed arm extending from the cylinder and a fixed arm extending from the piston. An actuator link is connected between these two arms and includes an extendable actuator shaft to move the arms relative to one another in order to steer the aircraft. When such mechanisms are utilized for steering over a wide angular range, such as 70 degrees in each direction, the moment arm determined by the distance between the actuator link and the axis of the cylinder, becomes very small at the both ends of the steering range and therefore, the steering mechanism develops substantially reduced torque at the large steering angles at the extremes of the angular steering range. Thus, the actuator must be designed to develop the large torque output required at the large steering angles even though this output far exceeds that required for the smaller steering angles in the center of the angular steering range. This excess of forces also requires increased strength and weight of the linkage members since the linkage mechanism must be designed to withstand maximum possible torque output, which occurs when the wheels are near the center of the steering range and are locked by a tow bar or are locked in a rut.

By the present invention, a steering mechanism is provided in which the required torque output of the actuator remains relatively constant over the wide steering angle range so that a smaller actuator can be utilized to obtain the required torque output over the complete steering range. With such mechanism, it is unnecessary for the output of the actuator to far exceed the torque requirement in the intermediate angular range in order to provide the torque requirement at the extremes of the range. Thus, the present invention not only reduces the size of the actuator but also reduces the weight of the linkage members since the members do not have to withstand a greatly increased torque output at the center of the steering range. The linkage mechanism of the present invention includes a fixed arm extending outwardly from the cylinder and a rotatable bell crank arm rotatably supported by the cylinder. The end of the rotatable arm pivotally connects with an actuator link and a rigid link pivotally connects with the rotatable arm at a location intermediate its ends. Both the actuator link and the rigid link pivotally connect with one end of a rigid anchor link, the other end of which pivotally connects with the arm fixed to the cylinder. The linear extension of the actuator incorporated in the actuator link causes rotational movement of the rotatable arm and this arm is connected to the piston through a flexible linkage in order to impart steering movement to the aircraft wheels, while permitting the piston to move within the cylinder to absorb shock. While the linkage mechanism is particularly suitable for the steering of aircraft, it has general utility for producing rotation of one member upon change in the length of another member of the mechanism. The actuator in the actuator link can also serve as a damper to damp rotary forces at the wheel during the time the actuator is not operative to develop a steering force.

It is therefore an object of the present invention to provide a linkage mechanism for conversion of length variation of one member into rotational movement of another member and which delivers a relatively constant torque output to the rotating member through a comparatively wide range of angular movement.

Another object of the invention is to provide a steering mechanism usable in conjunction with a typical aircraft landing gear shock absorber and incorporating a linkage mechanism in which the effective output torque stays relatively constant within the range of steering angles.

A further object of the invention is to provide a steering mechanism in which the actuator can be designed for substantially constant torque output over a wide steering angle range so that an actuator of minimum torque output can be utilized and the linkage members can be of minimum weight and strength.

A still further object of the invention is to provide a linkage mechanism for damping the rotational movement of one member relative to another member over a wide range of angular movement while maintaining a substantially constant torque between the members.

These and other objects of the invention, not specifically set forth above, will become readily apparent from the accompanying description and drawings in which:

Figure 1 is a perspective view of the front side of the steering mechanism of the present invention, showing the actuator link;

Figure 2 is a perspective view of the back side of the steering mechanism, showing the flexible linkage between the cylinder and the piston;

Figure 3:
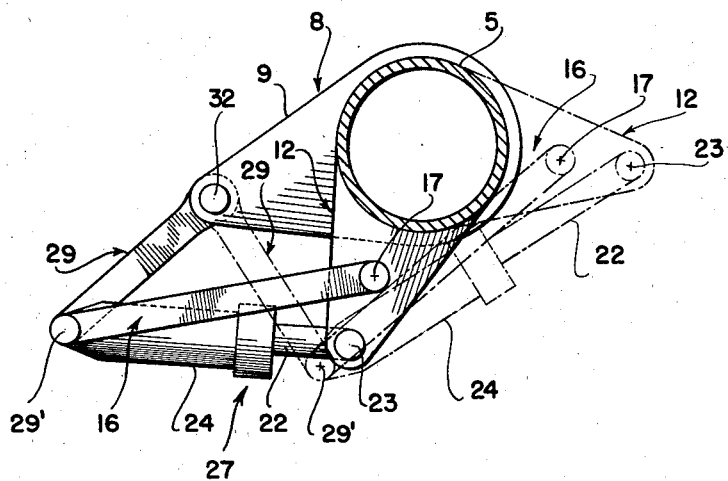
Figure 3 is a schematic view showing two positions of the steering mechanism.

One form of the invention usable with a steering mechanism is illustrated in Figures 1 and 2, wherein cylinder 5 of the landing gear shock absorber mechanism is open at its lower end to receive piston 6 and axles 7 for the aircraft wheels are secured to piston 6. The upper end of cylinder 5 is rigidly secured to the aircraft structure in any suitable manner for support. A fixed arm 8 is comprised of spaced lugs 9 and 10 which are secured to the end of cylinder 5 and extend outwardly. A collar 11 is rotatably mounted on the cylinder between lugs 9 and 10 and the collar 11 is restrained against axial movement by the lugs. Extending outwardly from collar 11 is a rotatable arm 12 comprised of upper and lower plates 13 and 14, respectively, connected together by side members 15.

A rigid link 16 is pivotally attached to arm 12, at a point intermediate the ends of the arm, by a pin 17.

which passes through the upper and lower members 18 and 19 forming the link 16 and through the upper and lower plates forming the arm 12. The members 18 and 19 are spaced from the adjacent plates 13 and 14, respectively, by a washer 20. The outer end of arm 12 is pivotally connected to the enlarged end 21 of an actuator shaft 22 by means of a pin 23 passing through the upper and lower plates of arm 12 and through end 21 located between the plates. The actuator shaft is moved by a piston (not shown) contained in cylinder 24 and the end of the cylinder carries a pair of spaced lugs 25 and 26. Cylinder 24 and shaft 22 comprise the actuator link 27.

The lugs 25 and 26 are located between the ends of members 18 and 19 of link 16 and receive the end 28 of a rigid anchor link 29. A pin 29' passes through members 18 and 19, lugs 25 and 26 and end 28 in order to pivotally connect the ends of links 16, 27 and 29 together. The link 29 is formed of two arms 30 and 31 connecting at end 28 and the arms diverge from end 28 so that the other ends of the arms are located adjacent to the lugs 9 and 10 of fixed arm 8. A pin 32 passes through lugs 9 and 10 and arms 30 and 31 in order to pivotally connect link 29 to the end of fixed arm 8. It is therefore apparent that a change in length of actuator link 27 will result in angular movement of arm 12 and collar 11 about the axis of cylinder 5.

A pair of spaced lugs 33 and 34 are secured to collar 11 at a position spaced from arm 12 (see Figure 2) and are pivotally connected to the ends of arms 35 and 36 of U-shaped link 37 by means of pin 38. The other end of link 27 is pivotally connected to one end of U-shaped link 38, formed of arms 39 and 40, by means of pin 41. The other end of link 38 is pivotally connected to a pair of spaced brackets 42 and 43 by means of pin 44 passing through the brackets and arms 39 and 40. Brackets 42 and 43 are formed on a T-shaped fitting 45 which receives both axles 7 and piston 6 in order to secure these parts together. Thus, the rotation of collar 11 is transmitted to the piston 6 and axles 7 through links 37 and 38 and the links 37 and 38 permit axial movement of piston 6 within cylinder 7 to provide for shock absorption.

The operation of the linkage mechanism is best explained in connection with Figure 3 wherein two positions of the linkage is illustrated. Two fluid passages 46 and 47 (see Figure 1) connect with opposite ends of the cylinder 24 and the change in length of actuator link 27 results from fluid pressure introduced to one end or the other of the cylinder. The passages 46 and 47 are under the control of a suitable valve mechanism (not shown) forming a part of the steering system of the aircraft. Any suitable type of power means, either hydraulic, electrical or pneumatic could be utilized to change the length of the actuator link 27. Basically, the linkage mechanism consists of the bell crank arm 12 rotatable about the axis of cylinder 5 and an anchor link 29 secured to fixed arm 8 at a pivot point spaced from the cylinder axis. A variable truss is connected between the anchor link and the rotatable bell crank arm and consists of actuator link 27 and rigid link 16. A change in the length of actuator link 27 results in a large movement of bell crank arm 12 and a smaller amount of movement of the rigid anchor link 29. With this type of movement, it is inherent within the linkage mechanism to maintain a substantially constant moment arm about the cylinder axis. While the moment arm increases slightly as the center of the steering range is approached, the actuator 24 can be designed to produce the torque output required by the minimum moment arm and this torque output will not substantially exceed that required in the center steering range. A typical curve 50 of steering torque output vs. steering angle for the linkage mechanism is illustrated in Figure 4 and point 51 represents the torque output at the center of the center of the steering range corresponding to zero degrees steering angle. Points 52 and 53 represent the torque output at opposite extremes of the steering angle range and it is noted that the curve 50 is substantially flat over the range between points 52 and 53. A second curve 54 is typical of prior linkage mechanisms wherein the torque output increases rapidly in the center of the steering range and reaches a maximum at point 55. The linkage mechanisms for both curves 50 and 54 are designed to meet the required toque output at the extremes of the range (points 52 and 53) and thus, the actuator for the linkage mechanism of curve 54 must be of substantially larger capacity than the actuator for curve 50, representative of the present invention. Further, since the maximum torque output at point 55 of curve 54 substantially exceeds the maximum output at point 51 of curve 50, the linkage members of the mechanism for curve 54 must be substantially stronger and heavier than the members of the linkage mechanism for curve 50 of the present invention to withstand the maximum possible torque output which occurs near the center of the steering range and while the steering wheels are locked. Thus, the present invention permits a weight saving by utilizing a lighter actuator and a lighter linkage mechanism.

Figure 4:
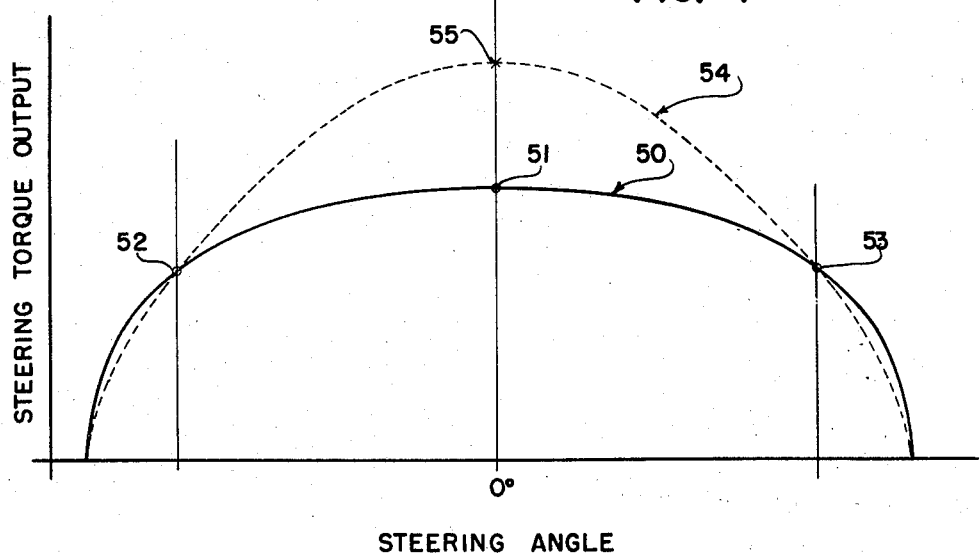
Figure 4 is a graphic illustration of a typical steering torque output curve for the linkage mechanism of the present invention.

With the linkage mechanism in the full line position of Figure 3, actuation of cylinder 24 will extend shaft 15 to rotate arm 12. At the same time, the anchor link 29 will rotate about fixed pin 32 a smaller amount than arm 12 rotates about the cylinder axis. The extended position of shaft 15 is illustrated by the dotted line position of Figure 3. For extremely large steering angle ranges, the link 16 can be curved to prevent engagement with the cylinder 5. Suitable operation could also be obtained by incorporating an actuator in link 16 instead of in link 27 so that link 16 would be of variable length. In general, the length of the various components of the linkage and the position of the pivot points can be varied in accordance with selected conditions of torque, output, steering range, etc. When the actuator cylinder 24 and associated piston is not being utilized to rotate the steering wheels, it can be utilized as a damper to rotary forces at the wheels since the fluid passages 46 and 47 serve as restriction to fluid flow.

The linkage mechanism of the present invention provides for converting a linear input of one component into an angular output of another component and is generally useful for this purpose in various types of devices. Also, a linkage connection is provided to transmit the angular output to parts movable bodily relative to the output component. Various modifications, other than those set forth herein, are contemplated by those skilled in the art without departing from the spirit and scope of the invention as hereinafter defined by the appended claims.

What is claimed is:

1. A linkage mechanism for converting a linear input into a rotational output comprising a support member, a movable member supported by said support member for rotation and bodily movement relative to said support member, a rotatable arm supported for rotation by said support member, an anchor link pivotally connected to a fixed arm secured to and extending from said support member, a variable truss connected between said rotatable arm and said anchor link, said variable truss comprising a pair of links both pivotally connected to said anchor link at the same point and both being pivotally connected to said rotatable arm at spaced pivot points, means for varying the length of one of the links of said pair to rotate said rotatable arm, and linkage means for transmitting the rotation of said rotatable arm to said movable member while permitting bodily movement of said movable member relative to said support member.

2. A steering mechanism for providing a substantially constant torque output over a wide steering angle range comprising a support cylinder, a piston having one end inserted within said cylinder for supporting said piston for axial movement along the axis of said cylinder and rotational movement about the axis of said cylinder, steering means secured to the other end of said piston, a rotatable arm having one end rotatably attached to said cylinder, an anchor link pivotally connected at one end to an arm fixed to and extending from said cylinder, a variable truss connected between said rotatable arm and said anchor link, said variable truss comprising a pair of links both pivotally connected at one end to the other end of said anchor link and both being connected at the other end to spaced pivot points on said rotatable arm, means for varying the length of one of the links of said pair in order to rotate said rotatable arm, and linkage means for transmitting the rotation of said rotatable arm to said steering means while permitting axial movement of said piston to absorb shock.

3. A steering mechanism as defined in claim 2 wherein said linkage means comprises first and second links pivotally connected together at one end, the other end of said first link being pivotally connected to said rotatable arm and the other end of said second link being pivotally connected to said piston and steering means.

4. A steering mechanism for providing a substantially constant torque output over a wide steering angle range comprising a support cylinder, a piston having one end inserted within said cylinder for supporting said piston for rotation and axial bodily movement relative to said cylinder, steering means secured to the other end of said piston, a rotatable collar on said cylinder for supporting a rotatable arm extending from said cylinder, a fixed arm extending from said cylinder and pivotally connected with one end of an anchor link, a variable truss connected between said rotatable arm and said anchor link, said variable truss comprising a linear extendable actuator link and a rigid link both pivotally connected at one end to the other end of said anchor link, the other end of said actuator link being pivotally connected to the end of said rotatable arm and the other end of said rigid link being pivotally connected to said rotatable arm at a position intermediate the ends of said rotatable arm, said actuator link comprising a fluid motor having a movable shaft for varying the length of said actuator link in order to rotate said rotatable arm, and flexible linkage means connected between said collar and said piston for transmitting the rotations of said rotatable arm to said steering means while permitting axial movement of said piston relative to said cylinder to absorb shock.

5. A linkage mechanism for converting a linear input to a rotational output comprising a bell crank arm supported by a collar for rotation about an axis, an anchor link pivotally connected at one end to an arm fixed to and extending from said axis, a variable truss connected between said bell crank arm and said anchor link, said variable truss comprising a linear extendable actuator link and a rigid link both pivotally connected at one end to the other end of said anchor link, the other end of said actuator link being pivotally connected to the end of said bell crank arm and the other end of said rigid link being pivotally connected to said bell crank arm at a position intermediate the ends of said bell crank arm, means for varying the length of said actuator link in order to rotate said bell crank arm, said linkage mechanism maintaining a substantially constant moment arm about said axis over a wide range of angular movement of said bell crank arm, a member spaced from said bell crank arm and supported for rotational movement with said bell crank arm and for axial movement along said axis, and linkage means for connecting said bell crank arm with said member, said linkage means comprising a first and second link pivotally connected together at one end, the other end of said first link being pivotally connected to said collar of said bell crank arm and the other end of said second link being pivotally connected to said member.

References Cited in the file of this patent

UNITED STATES PATENTS

| 2,621,002 | Pittman | Dec. 9, 1952 |
| 2,779,556 | Hogan | Jan. 29, 1957 |

FOREIGN PATENTS

| 1,115,813 | France | Apr. 30, 1956 |